United States Patent [19]

Eichelberger et al.

[11] Patent Number: 4,646,135
[45] Date of Patent: Feb. 24, 1987

[54] SYSTEM FOR ALLOWING TWO TELEVISION PROGRAMS SIMULTANEOUSLY TO USE THE NORMAL BANDWIDTH FOR ONE PROGRAM BY CHROMINANCE TIME COMPRESSION AND LUMINANCE BANDWIDTH REDUCTION

[75] Inventors: Charles W. Eichelberger, Schenectady; Robert J. Wojnarowski, Ballston Lake, both of N.Y.

[73] Assignee: General Electric Company, Schenectady, N.Y.

[21] Appl. No.: 697,535

[22] Filed: Feb. 1, 1985

[51] Int. Cl.⁴ .................. H04N 11/06; H04N 7/08; H04N 7/04
[52] U.S. Cl. .................... 358/12; 358/142; 358/145; 358/146; 358/147
[58] Field of Search ............. 358/12, 142, 143, 145, 358/146, 147, 133

[56] References Cited

U.S. PATENT DOCUMENTS

| | | | |
|---|---|---|---|
| 3,781,463 | 12/1973 | Van den Bussche | 358/12 |
| 3,991,266 | 11/1976 | Baer | 358/146 |
| 4,084,181 | 4/1978 | Mita et al. | 358/12 |
| 4,215,370 | 7/1980 | Kirk, Jr. | 358/146 |
| 4,467,356 | 8/1984 | McCoy | 358/12 |

Primary Examiner—Michael A. Masinick
Assistant Examiner—Robert M. Bauer
Attorney, Agent, or Firm—Marvin Snyder; James C. Davis, Jr.

[57] ABSTRACT

A method and apparatus for bandwidth compression allows two television programs to simultaneously occupy the bandwidth normally allowed for one television program. The composite video signals from first and second program sources are separated into chrominance, luminance and synchronization component signals for each. The chrominance signals for each program source are compressed in time, and the sync pulse from one of the program sources is used to generate a narrow sync pulse. The luminance signal from the one program source modulates a carrier signal, and the luminance signal from the other program source modulates a subcarrier signal. The compressed chrominance signals for the first and second program sources are transmitted, with the narrow sync pulse, for alternate lines of each image frame for each program, respectively, during the inactive video time, and the luminance signals for both program sources are transmitted during the active video time for each line of each image frame for each program, respectively. At the receiver, the compressed chrominance and the luminance signals for both program sources are detected, and the compressed chrominance and the luminance signals for one or the other of the two program sources are selected. The selected chrominance signal is stored during the inactive video time in an analog delay line, the output of which is combined with the selected luminance signal to reconstruct a composite video signal for the selected program source during the active video time in the selected program.

24 Claims, 10 Drawing Figures

SYSTEM FOR ALLOWING TWO TELEVISION PROGRAMS SIMULTANEOUSLY TO USE THE NORMAL BANDWIDTH FOR ONE PROGRAM BY CHROMINANCE TIME COMPRESSION AND LUMINANCE BANDWIDTH REDUCTION

CROSS-REFERENCE TO RELATED APPLICATIONS

This application discloses subject matter which is related to the subject matter disclosed in the following copending and commonly assigned applications & commonly assigned U.S. patent:

U.S. Pat. No. 4,533,960 issued to Tiemann, Cutler and Welles for "System for Encoding and Decoding Video Signal".

U.S. Pat. No. 4,533,936 issued to Tieman and Engeler for "System for Encoding and Decoding Video Signals".

Ser. No. 06/697,600 filed concurrently herewith by Eichelberger, Wojnarowski and Mihran for "Sharpness Enhanced Equal Bandwidth Luminance Bandwidth Reduction System".

Ser. No. 06/697,560 filed concurrently herewith by Wojnarowski and Eichelberger for "Alternate Field Luminance Enhancement in a Spectrum Conserving Television System".

Ser. No. 06/697,601 filed concurrently herewith by Welles, Eichelberger and Wojnarowski for "Television Frame Synchronizer with Independently Controllable Input/Output Rates".

The disclosures of the foregoing copending patent applications are incorporated herein by reference.

BACKGROUND OF THE INVENTION

The present invention generally relates to a technique and apparatus for optimizing the use of frequency spectrum allocated for the transmission of information and, more particularly, to a method and corresponding apparatus which allows two television signals to be transmitted using the same bandwidth normally used to transmit one television signal.

The general problem solved by the invention is to transmit two television programs simultaneously in the six megahertz channel space normally allotted for one program and allow reception of either program at each of a plurality of locations where the programs are received. This is particularly desirable in cable television systems in which a limited number of channels are available for transmitting television programs to subscribers. Several methods for achieving this improvement in spectrum utilization have been implemented in the prior art; however, each of the prior art methods have resulted in problems of performance and/or cost.

Typically, prior art systems used to process television signals have used a technique of sending one horizontal line at high bandwidth followed by limited bandwidth information which in combination with the first line can be used to form the second horizontal line. These techniques invariably generate visible artifacts in vertical lines that show up as alternate wide and narrow portions known as "zippering" or a stair-step pattern on slat lines known as "jaggies". The problem then becomes one of providing a bandwidth reduction system without easily noticed and objectionable artifacts.

In the typical prior art frequency division multiplex approach, it has been necessary to provide a single horizontal line of storage. A problem with this approach is the cost and complexity of producing a quality line of horizontal storage. For good quality imaging, a 910 pixel delay line with 100:1 or better dynamic range is typically required at the receiving locations. In the present system, however, the apparatus necessary to decode the transmitted signals is required to be a minimum cost item because it must compete in price with converters which have no processing. Prior art time division multiplexed approaches require two horizontal lines of storage because information is being displayed on the television screen at the same time new information is arriving in a time compressed form. When high resolution and long storage times are required, analog delay lines cannot be used because they tend to leak charge during storage causing a loss of resolution. Digital techniques can meet the performance requirements but digital delay lines presently cost five to ten times the cost of a charge coupled device (CCD) that is typically used as an analog delay line.

Because a television picture generally suffers some degradation when the video signal is processed through a system optimized to conserve spectrum, it is sometimes desirable to enhance the sharpness of the edges of the picture to preserve a crisp, sharp picture. In the prior art systems, the slant line artifacts (jaggies) are further enhanced when the sharpness of the picture is enhanced, making them more objectionable. The problem, more specifically then, is to provide a bandwidth reduction system which is amenable to edge enhancement without also enhancing visible artifacts.

SUMMARY OF THE INVENTION

It is therefore an object of the present invention to provide a method and system such that two television programs can simultaneously be transmitted using a six megahertz channel such as is presently designated for transmitting one television program.

It is another object of the invention to provide a spectrum conserving television signal transmission system, the system providing a receivable video signal capable of providing a display with no obvious artifacts and little or no perceived picture degradation.

Still another object of the instant invention is to provide a television bandwidth reduction system which requires a minimum of receiver processing during the active picture time such that all processing during active video time occurs in real time without time compression.

Yet another object of the invention is to provide a spectrum-conserving television system which does not require a high bandwidth or high resolution horizontal line memory and therefore can easily use presently available charge coupled device technology to provide horizontal line memory.

A further object of the invention is to provide a television bandwidth reduction system which is amenable to peaking and signal enhancement without also enhancing the picture artifacts.

Still another object of the invention is to provide a television bandwidth reduction system in which the effects of overlap between the spectra of two television programs transmitted simultaneously within the same bandwidth cause minimum observable effect in the program selected for viewing at the receiver.

The subject invention is described herein with reference to NTSC (National Television systems Committee) color television standards, but those skilled in the art will understand that the principles of the invention can be applied to PAL (Phase Alternation Line) and SECAM (Sequentiel Couleur Avec Memoire) systems as well. In general, the same red, green and blue (RGB) pickup devices and the same three primary color display devices are used in all three systems. The function of the camera is to analyze the spectral distribution of the light from the scene in terms of its red, green and blue components on a point-by-point basis and encode this invention in terms of its brightness, hue and saturation for transmission over a band-limited communications channel. In each of the three systems, one signal, known as luminance, occupies the wide-band portion of the channel and conveys the brightness as well as the detail information content. A second signal, known as chrominance, conveys the chromatic attributes of hue and saturation. The chrominance signal is assigned to less channel width in accordance with the principle that in human vision, full three-color reproduction is not required over the entire range of resolution. Another common feature of the three systems is that the chrominance and luminance signals are arranged within the same frequency bandwidth without excessive mutual interference. In the NTSC system, the color subcarrier frequency is so chosen as to be an odd multiple of one-half the line rate such that the phase of the subcarrier is exactly opposite on successive scanning lines. The PAL and SECAM systems use different modulating processes for encoding and transmitting the chrominance information. The resulting luminance and chrominance signals are combined to form a composite video signal for transmission. This composite video signal also includes synchronizing information for identifying the frames and lines of the transmitted signal.

According to the invention, the method of bandwidth reduction involves sending the chrominance information in time-compressed form during the inactive picture time. By "inactive picture time" what is meant is the normal horizontal retrace time plus the time of the nonvisible overscan of a line. In the NTSC composite video signal, for example, this is the time period during which the synchronizing signal is transmitted. In order to provide room for the timecompressed chrominance information, the synchronizing signal is narrowed. The synchronizing signal may precede or follow the time-compressed chrominance information, and in the preferred embodiment, the polarity of the synchronizing signal is reversed to allow an increase in the dynamic range of the composite signal. Chrominance information for a given program is sent once every other line with the other program chrominance information occupying the unused line position. Luminance information for both programs is sent during the active video time for each line. By "active video time" what is meant is that time period of the composite video signal during which a visible image is produced. The way in which the luminance information for both programs is sent simultaneously is by modulating one program on the main carrier and modulating the second program on a subcarrier approximately 4.5 MHz removed from the main carrier.

Copending patent application 06/435,792 by Tiemann, Cutler and Welles and 06/479,584 by Tiemann and Engeler reference above disclose frequency division and time division multiplexing techniques, respectively. The present invention differs therefrom at least in that the luminance information for both channels is sent on a lineby-line basis with no processing except for demodulation required during the active video time.

In the aforementioned prior art systems, a high bandwidth version of a line is sent along with a low bandwidth correction signal which is used to subsequently reconstruct a second line. These systems require that the high quality version of the horizontal line be stored such that it can be used along with the low bandwidth correction signal in the reconstruction of the second horizontal line. If the stored version and the correction information are not accurate to within one part in 100, a condition known as line pairing will obtain in which every other line in a field is observably different in amplitude level.

In the present invention, chrominance information is demodulated to its quadrature components and sent in time compressed form. This is similar to the time division multiplexed system; however, the invention is distinguished from the time division multiplexed system in that the compressed chrominance information is sent during the horizontal retrace interval while no picture information is appearing on the screen. The luminance information is sent in real time thus obviating the need for any storage elements to store high bandwidth, high resolution luminance information.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

Figure 1A:
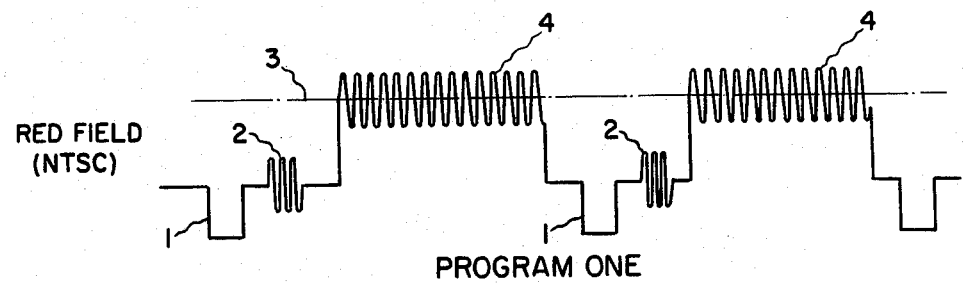
FIGS. 1A, 1B and 1C are drawings of waveforms showing two signals in the NTSC format and a video signal formatted according to the method of the invention to combine the information in the two NTSC signals.
Figure 1B:
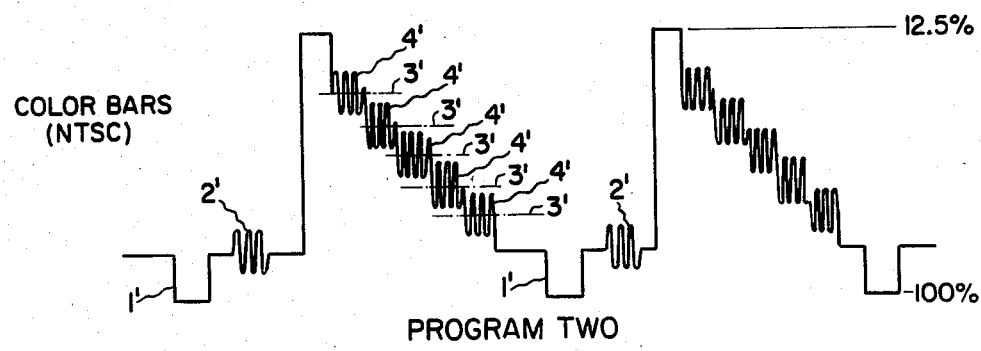
Figure 1C:
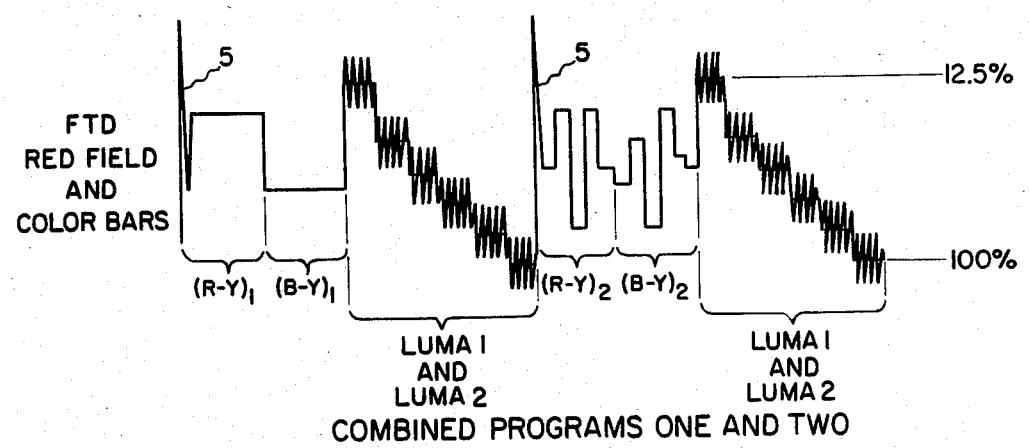

Referring now to the drawings, and more particularly to FIGS. 1A, 1B and 1C, there are shown two video signals in the NTSC format and a composite video signal as generated according to the method of the invention and including the significant chrominance and luminance information in the NTSC signals. A video signal as represented in FIG. 1A may be utilized by a television receiver to generate a flat red field, and a video signal as represented in FIG. 1B may be utilized by a television receiver to generate color bars. As shown in FIG. 1A, a horizontal line of program one consists of a sync pulse 1 and a color burst 2, followed by a luminance level 3 with the chrominance subcarrier information 4 riding thereon. As shown in FIG. 1B, program two consists of a sync pulse 1' and a color burst 2', followed by luminance information 3' at various levels with chrominance information 4' riding thereon with various phases of the color subcarrier representing the various colors. FIG. 1C shows the recovered baseband signal produced in the receiver by the bandwidth reduction technique according to the invention. The waveform in FIG. 1C comprises a narrowed sync pulse 5 followed by time-compressed R-Y and B-Y chrominance information derived from program one as signified by the subscript 1. R, B and Y are abbreviations for red, blue and luminance, respectively, and the R-Y and B-Y signals are termed the color difference signals. With the NTSC signals synchronized as shown in FIGS. 1A and 1B, the R-Y and B-Y information for a line is sent during the inactive video time as previously defined, this time including the horizontal retrace interval. During the luminance portion of the signal, the luminance for program one occurs as baseband information while luminance for program two is encoded as the modulation of a subcarrier 4.5 MHz removed from the main carrier. Following the luminance information for the first line is another narrowed sync pulse 5 followed by time-compressed R-Y and B-Y chrominance information signals derived from program two as signified by the subscript 2. Again, the luminance information for both programs is encoded during the active video time. It is important to note that the R-Y and B-Y chrominance information for a given line is available before the active video portion of that line. Note also that both luminance signals for program one and for program two are available during each active video line. This obviates the requirement for a high quality memory for luminance information.

Of particular interest are the narrowed sync pulses 5 shown in FIG. 1C. First of all, note that in the Figure the sync pulse occurs at the beginning of the horizontal line which precedes in time the normal NTSC sync pulse as shown for example in FIGS. 1A and 1B. However, it is not necessary that the sync pulse occur at the beginning of the horizontal line. It could alternatively occur after the chrominance information. In fact, there is an advantage in placing the sync pulse after the chrominance information so that ringing produced by the sync pulse does not adversely affect the chrominance information. Such ringing is not as critical in its effect on the luminance information which is not compressed.

Secondly, note that the direction of modulation of the sync pulses in FIG. 1C is opposite to the NTSC sync pulses shown in FIGS. 1A and 1B. According to the NTSC standard, the sync pulse is at 100% modulation of the carrier as indicated in FIG. 1B. At the other end of the modulation scale, the minimum luminance modulation, corresponding to peak white, is 12.5%. In other words, the dynamic range of the NTSC signal as a percent of carrier modulation is 87.5% including the sync pulse. In contrast, it will be observed that the dynamic range of the signal illustrated in FIG. 1C is 87.5% excluding the sync pulse. Thus, this aspect of the invention increases the dynamic range of the signal. The sync pulse in the signal shown in FIG. 1C can be produced at the transmitter by modulating to −100%, where negative modulation figures mean a reverse in phase of the carrier. This phase reversal, however, causes no problems in the receiver since the sync pulse is too narrow to allow the phase detection circuitry in the receiver to follow the reverse phase carrier.

Figure 2:
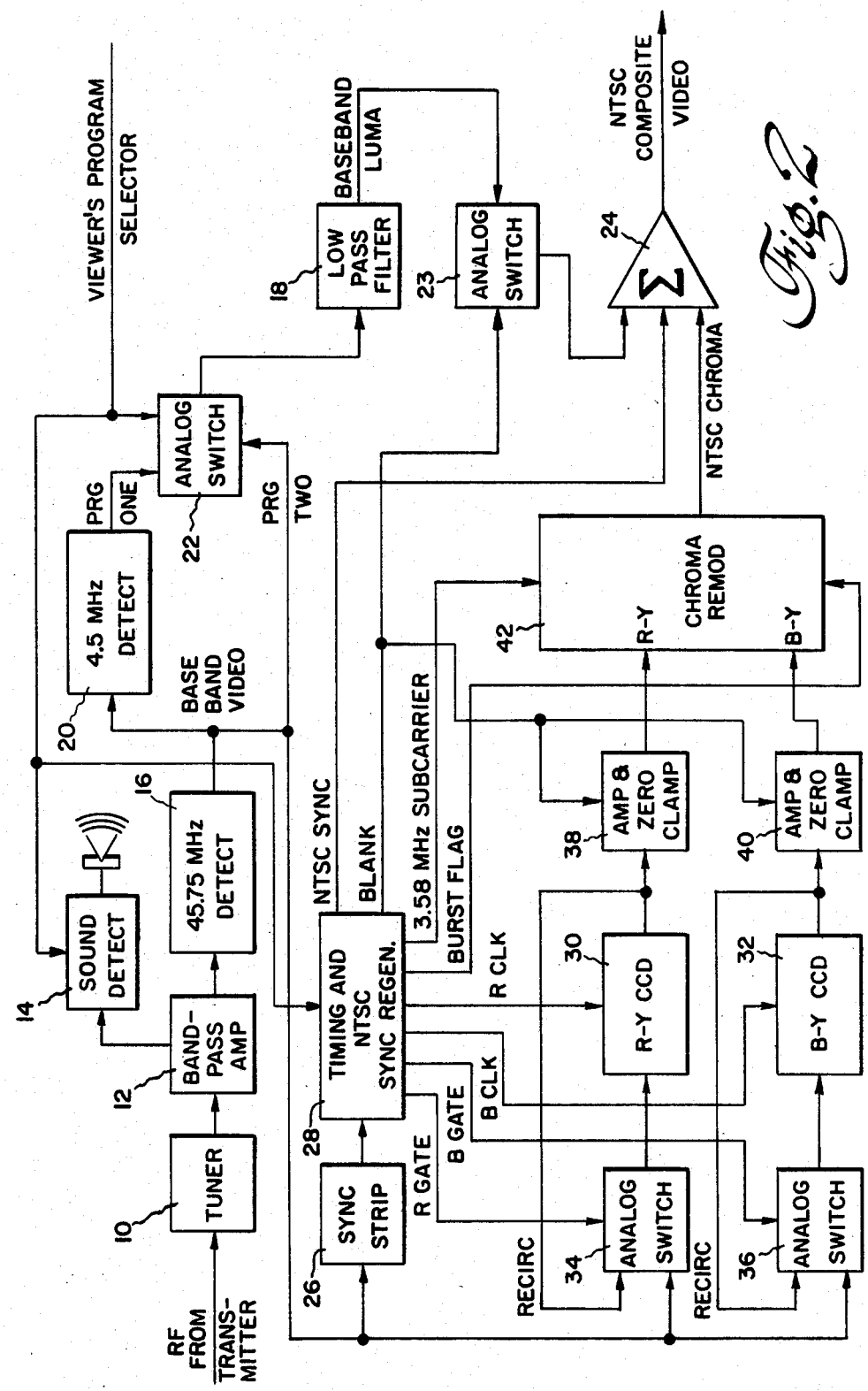
FIG. 2 is a block diagram of a receiver according to the invention.

FIG. 2 shows a block diagram of a receiver useful for reconstructing NTSC composite video signals according to the invention. Receivers like that shown in FIG. 2 may be situated at each subscriber location in a cable television system, for example, In this embodiment, radio frequency (RF) from a cable television system or from an antenna is fed into a tuner 10 which selects the desired channel and provides at its output an intermediate frequency (IF) signal. This IF signal is fed to a bandpass amplifier 12 which rejects unwanted signals adjacent in frequency. Part of the IF signal is picked off and sent to the sound detector 14 which detects the appropriate sound carrier for the selected channel and demodulates the sound. The bandpassed IF video signal is sent to a first detector 16, the output of which is baseband video of the form shown in FIG. 1C. The output signal of detector 16 is supplied to a second detector 20 in tandem with the first. The purpose of the second detector is to detect the subcarrier signal. However, those skilled in the art will recognize that the same function can be accomplished with two detectors in parallel rather than in tandem. In this case, detector 16 would detect a 45.75 MHz signal as before, but detector 20 would detect a signal at 41.25 MHz, the subcarrier being removed from the carrier by 4.5 MHz. The detectors 16 and 20 could be implemented as synchronous detectors, if desired.

Luminance information is extracted either by low pass filtering the baseband video from detector 16 to extract program two and reject the subcarrier modulated program one video, or by low pass filtering the output of detector 20 thereby extracting program one. This is accomplished with low pass filter 18 and switch 22 which selects program one or program two. The switch 22 may be implemented with an RCA CD4066 CMOS analog switch. In either case, the resulting output signal from the low pass filter 18 is supplied via another analog switch 23 to one input of summing amplifier 24 which provides the NTSC composite video output.

Figure 3:
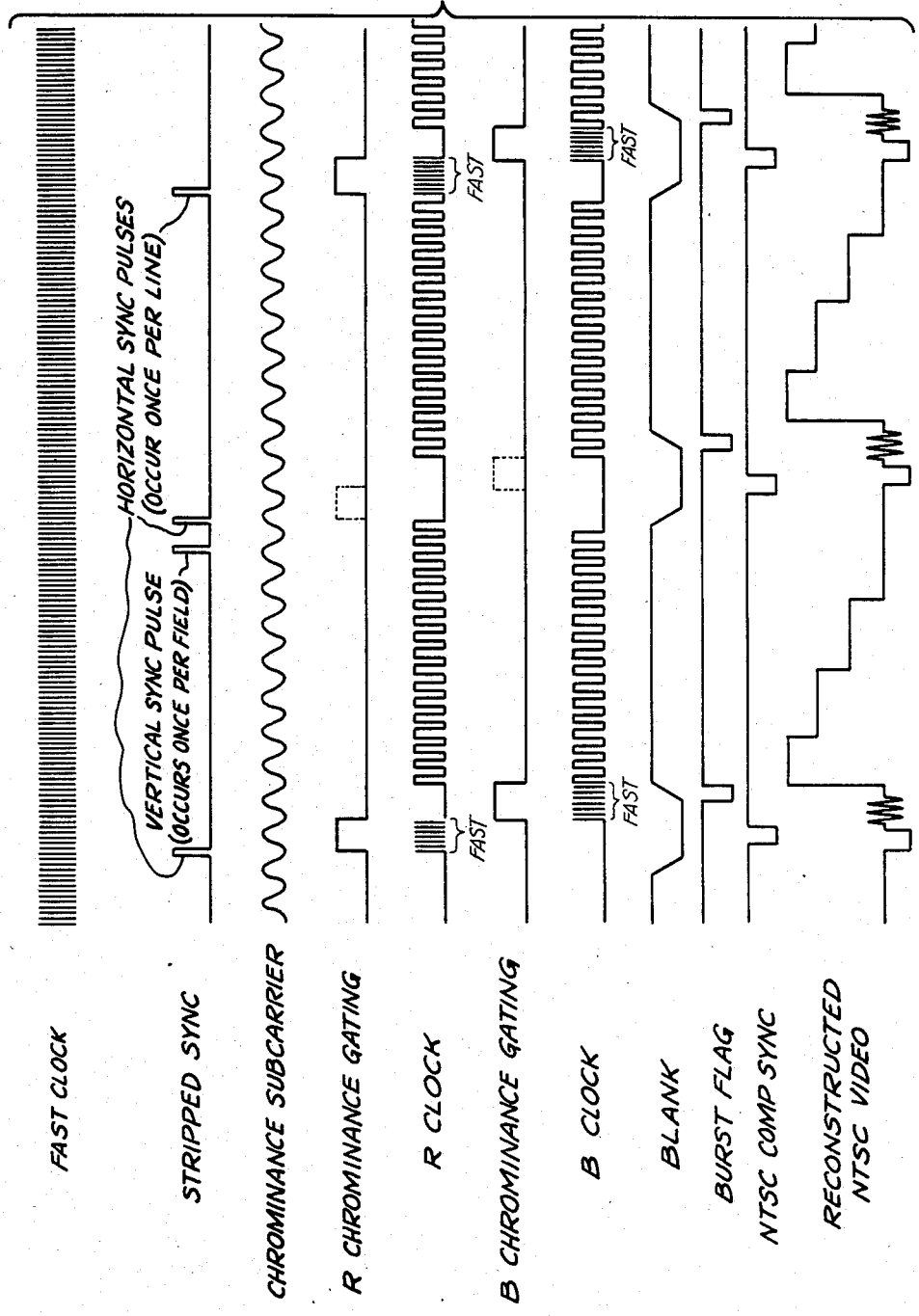
FIG. 3 is a timing diagram showing the operation of the receiver portion shown in FIG. 2.

The sync information is stripped from the baseband video in sync stripper 26 and used to control sync and timing for the rest of the system. The stripped sync pulses are shown in FIG. 3, and since the baseband sync pulses as shown in FIG. 1C extend above the entire luminance information, the sync stripper may be implemented with a simple clamping circuit followed by a threshold detector circuit. Circuit 28 generates timing for the system and also provides the NTSC composite sync to an input of summing amplifier 24. More specifically, the timing circuit 28 generates R chrominance and B chrominance gating signals for the selected program, synchronized with the stripped sync pulses as shown in FIG. 3. It will be noted that these gating signals occur every other line depending on whether program one or program two is selected for viewing. In FIG. 3, the dotted pulses represent the gating signals for the non-selected program. During the R gating pulse, circuit 28 produces a fast clock signal which is part of the R clock signal, and during the B gating pulse, circuit 28 produces a fast clock signal which is part of the B clock signal. These fast clock signals occur only during every other horizontal blanking interval. Between horizontal blanking intervals, circuit 28 produces a low speed or normal clock signal for each of the R and B clock signals. The manner in which these gating and clock signals are produced is well within the purview of one of ordinary skill in the art. Suffice it to say that circuit 28 is readily implemented with commercially available synchronizing and pulse forming circuits in combination with counters to establish relative timing of the various signals.

The baseband video information is also furnished to two charge coupled delay (CCD) lines 30 and 32 via switches 34 and 36 driven by the R and B gating signals, respectively. The switches 34 and 36 may be RCA CD4066 CMOS analog switches, and the delay lines may be Plessey MS1008 charge coupled devices. these delay lines store the B-Y and R-Y information, and when the chrominance information for the desired program is available during horizontal retrace time, switches 34 and 36 are switched to receive the baseband video. The timing is shown in FIG. 3. The R chrominance gating signal controls switch 34 to supply base band video to the input of CCD 30. The R-Y color difference information is clocked into the CCD 30 at a high rate by the R clock signals. Similarly, the B chrominance gating signal controls switch 36 to supply base band video to the input of CCD 32. Again, the dotted line pulses in the R chrominance and B chrominance gating signals indicate the non-selected program chrominance information times. In other words, chrominance information is read into CCDs 30 and 32 only every other line. The vertical sync pulse, which appears once for every individual field, and is identified in the stripped sync waveform of FIG. 3, allows timing and NTSC sync regenerator 28 to pick off the appropriate alternate lines for the selected program. When the active video region is entered, the clock in circuit 28 is slowed to one eighth to one twelfth of the fast rate for an NTSC system, and switches 34 and 36 are switched to the recirculate position. Higher ratios of fast and slow clock rates can be used with other international standard systems. As the R-Y and B-Y information is clocked from the CCDs, that same information is recirculated back into the inputs of the CCDs and in so doing, the same chrominance information for the selected program is repeated on two adjacent horizontal lines. The output signals of the CCDs 30 and 32 are fed to respective amplifiers 38 and 40 which restore their respective input signals to DC reference.

While the embodiment shown in FIG. 2 employs two CCDs 30 and 32 in which the R-Y and B-Y chrominance information is recirculated, those skilled in the art will recognize that the same function can be achieved with different circuit configurations. For example, each of the CCDs 30 and 32 can be replaced by a pair of CCDs, one CCD in each pair having a greater time delay than the other. The R-Y chrominance information is first read into one pair of CCDs, and then the B-Y chrominance information is read into the second pair of CCDs. In the first of two adjacent horizontal lines, chrominance information is read out of the CCD having the shorter time delay in each pair of CCDs, and then in the second horizontal line, the same chrominance information is read out of the CCD having the longer time delay in each pair of CCDs. Thus, the chrominance information need not be recirculated in order for the same chrominance information to be repeated on two adjacent horizontal lines.

The output signals of amplifiers 38 and 40 are clamped to zero during the horizontal blanking interval by the blanking pulses from circuit 28. These blanking pulses are shown in FIG. 3 and also control switch 23 so that this switch is nonconductive during the horizontal blanking interval. In this way, noise is prevented from being supplied to the inputs of amplifier 24 during the horizontal retrace interval. The amplified and properly referenced R-Y and B-Y information from circuits 38 and 40 is then used to modulate a 3.58 MHz subcarrier from circuit 28 in a chrominance remodulator 42 which may be a NEC μPC-580C Chroma Processor. The chrominance subcarrier is illustrated in FIG. 3 and is conveniently produced by a phase locked loop (PLL) locked to the sync pulse. The chrominance subcarrier undergoes 455 reversals between every other sync pulse as is well known in the art. The circuit 28 also produces a burst flag occurring after the blank pulses as illustrated in FIG. 3 and supplies this burst flag to the chrominance remodulator 42 to gate the remodulator on. The resultant output of remodulator 42 is an NTSC chrominance signal that is supplied to yet another input of the summing amplifier 24. This completes the synthesis of the NTSC standard composite video which can be utilized by an ordinary television set.

Figure 4:
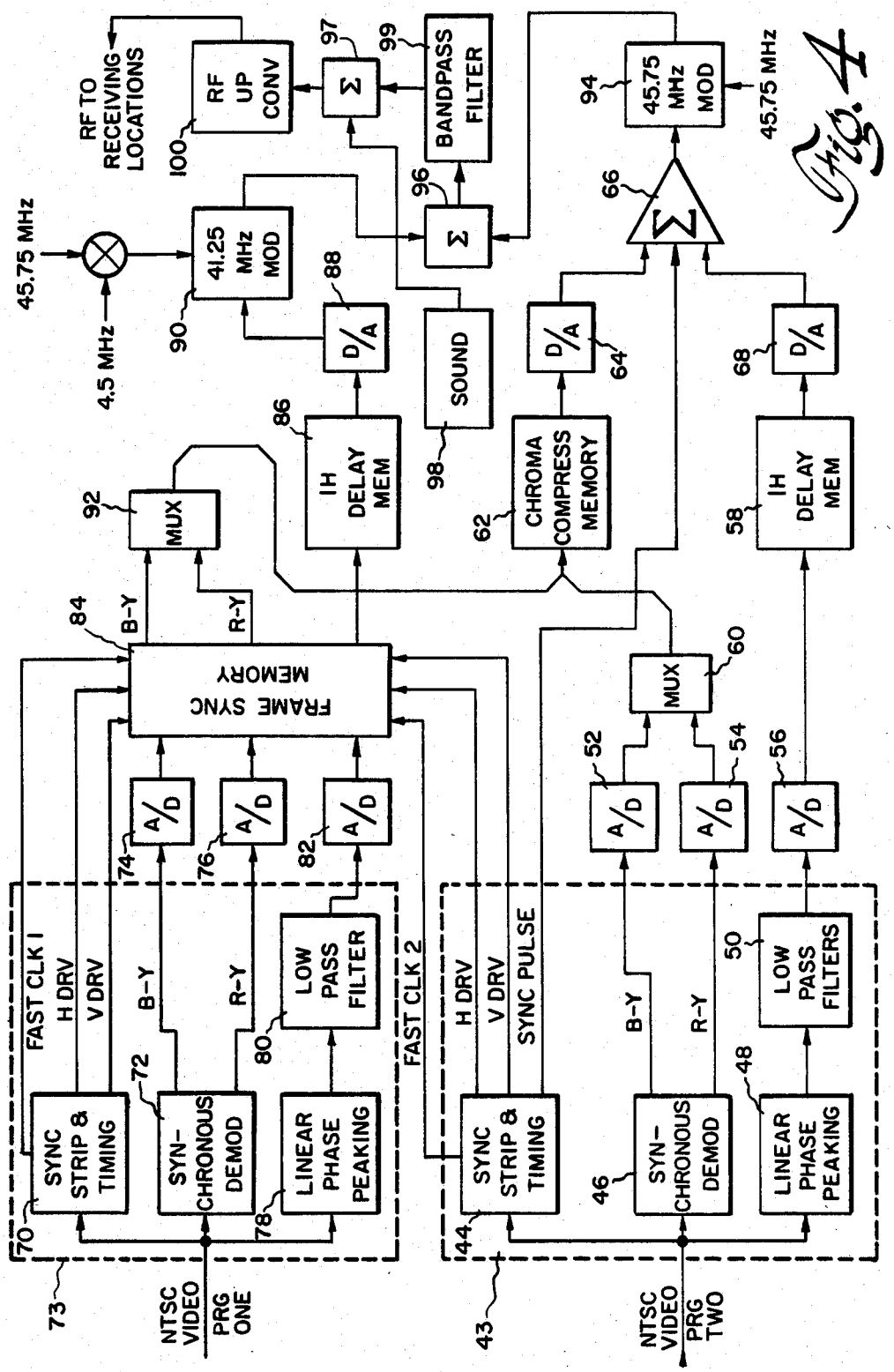
FIG. 4 is a block diagram of a transmitter according to the invention.
Figure 5:
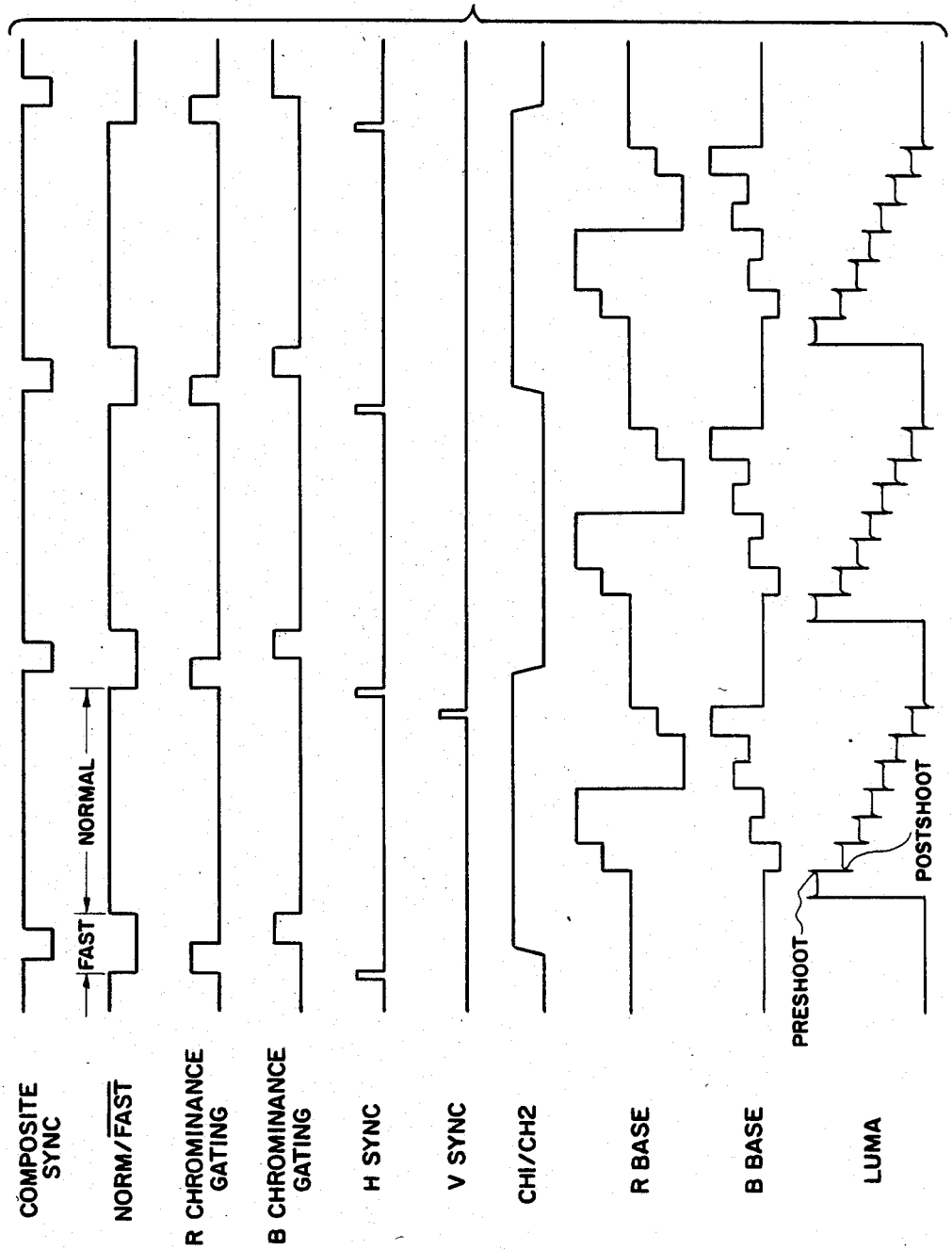
FIG. 5 is a timing diagram showing the operation of the transmitter portion shown in FIG. 4.

FIG. 4 shows a block diagram of the transmitter, and in the following description, the transmitter is first described in terms of the inputs receiving program two and then in terms of the inputs receiving program one. NTSC standard baseband video is provided as the incoming program two signal to video processor circuitry 43. A sync stripping and timing circuit 44 strips the sync signal and identifies the horizontal and vertical intervals represented by the H DRV and V DRV output signals. The composite sync for program two, stripped by circuit 44, is shown in FIG. 5. The horizontal (H) sync pulse for program two shown in FIG. 5 is derived from the stripped composite sync. The vertical (V) sync pulse occurs once per field and is derived from the vertical interval portion of the composite sync. As is well known, in the standard NTSC signal, the vertical interval is identified by a serrated vertical pulse. The chrominance information is split into quadrature R-Y and B-Y components typically using a synchronous demodulator circuit 46. The R-Y component for program two is shown in FIG. 5 labeled R Base. The B-Y component for program two is shown labeled B Base. The luminance information for program two is processed by limiting its bandwidth so that it can be accommodated by a predetermined channel bandwidth. A linear phase peaking circuit 48 supplying a low pass filter 50 is used. In the preferred embodiment, the phase peaking circuit comprises a tapped delay line, a differencing amplifier for combining weighted outputs of the tapped delay line, and an edge peaking circuit driven by the differencing amplifier. The output signal of the edge peaking circuit is equalized and filtered in filter 50 exhibiting a slow rolloff response to about 6 dB and then exhibiting a sharp cutoff response. The combination of the phase peaking circuit 48 and the low pass filter 50 enhances the sharpness of the bandwidth compressed pictures. The luminance information for program two is shown in FIG. 5 labeled Luma. Note that there is preshoot and postshoot associated with each transition in the luminance signal. This tends to sharpen the image when reproduced on a television screen. Further details of this optimal filtering and peaking circuit are provided in copending patent application Ser. No. 06/697,600 by Eichelberger, Wojnarowski and Mihran .

Figure 6:
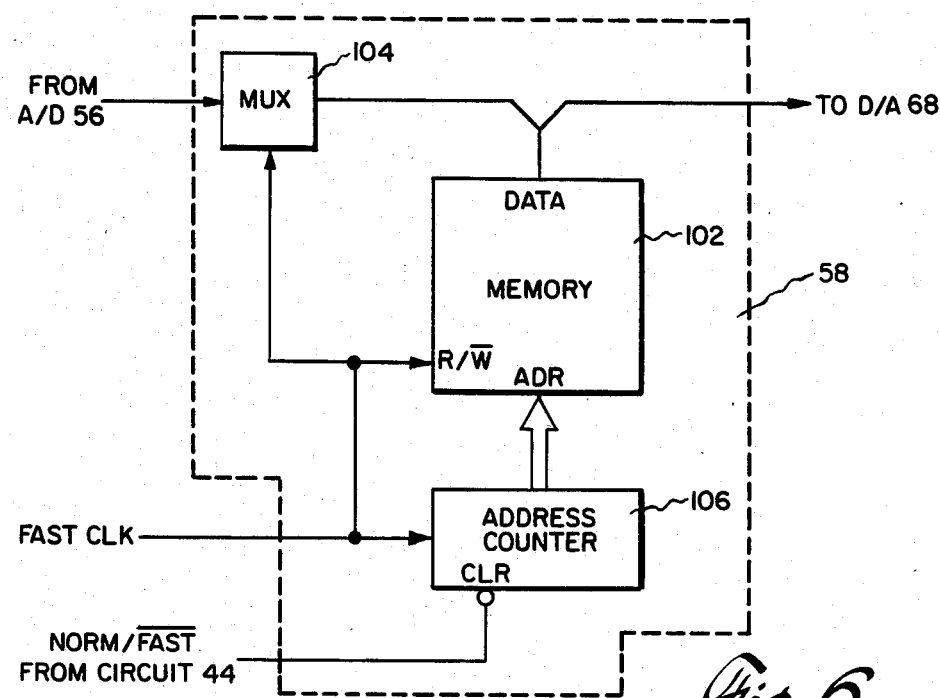
FIG. 6 is a block diagram of the one horizontal line delay memories used in the transmitter shown in FIG. 4.

The three output signals B-Y, R-Y and filtered luminance are each converted to digital values by analog-to-digital (A/D) converters 52, 54 and 56, respectively, which sample the outputs at greater than the Nyguist rate. The luminance data from A/D converter 56 is sent to a memory 58 which provides one horizontal line of delay in order to accommodate the fact that the compressed chrominance cannot be sent until all the chrominance information for a given line has been received. In FIG. 6, the memory 58 is shown in more detail and comprises an IC memory 102 which may comprise two Intel 2149H chips. Data from the A/D converter 56 is supplied to the memory 102 via a multiplexer 104 which functions as a transmission gate. The multiplexer 104 may be tri-state latches as packaged in a standard 74S374 integrated circuit (IC) as described, for example, in the *TTL Data Book* published by Texas Instruments. The multiplexer 104 is gated open when the fast clock is low, thus supplying data from A/D converter 56 to memory 102. This data is written in memory 102 when the fast clock signal supplied to the read/write control input R/$\overline{\text{W}}$ transitions from low to high. When the fast clock signal is high, multiplexer 104 is gated to its tri-state condition, memory 102 is set to the read mode by the fast clock signal at the R/W input and data is supplied from memory 102 to D/A converter 58. The address counter 106 is incremented during the transition of the fast clock signal from low to high. Since counter 106 supplies the address to memory 102, each successive address location in memory 102 is first read from and then written to. The one horizontal line delay is achieved by reading data stored at each memory address before loading new data to that address. Since the address counter 106 is reset each horizontal line by the normal/fast signal, exactly one horizontal line delay is achieved.

Figure 7:
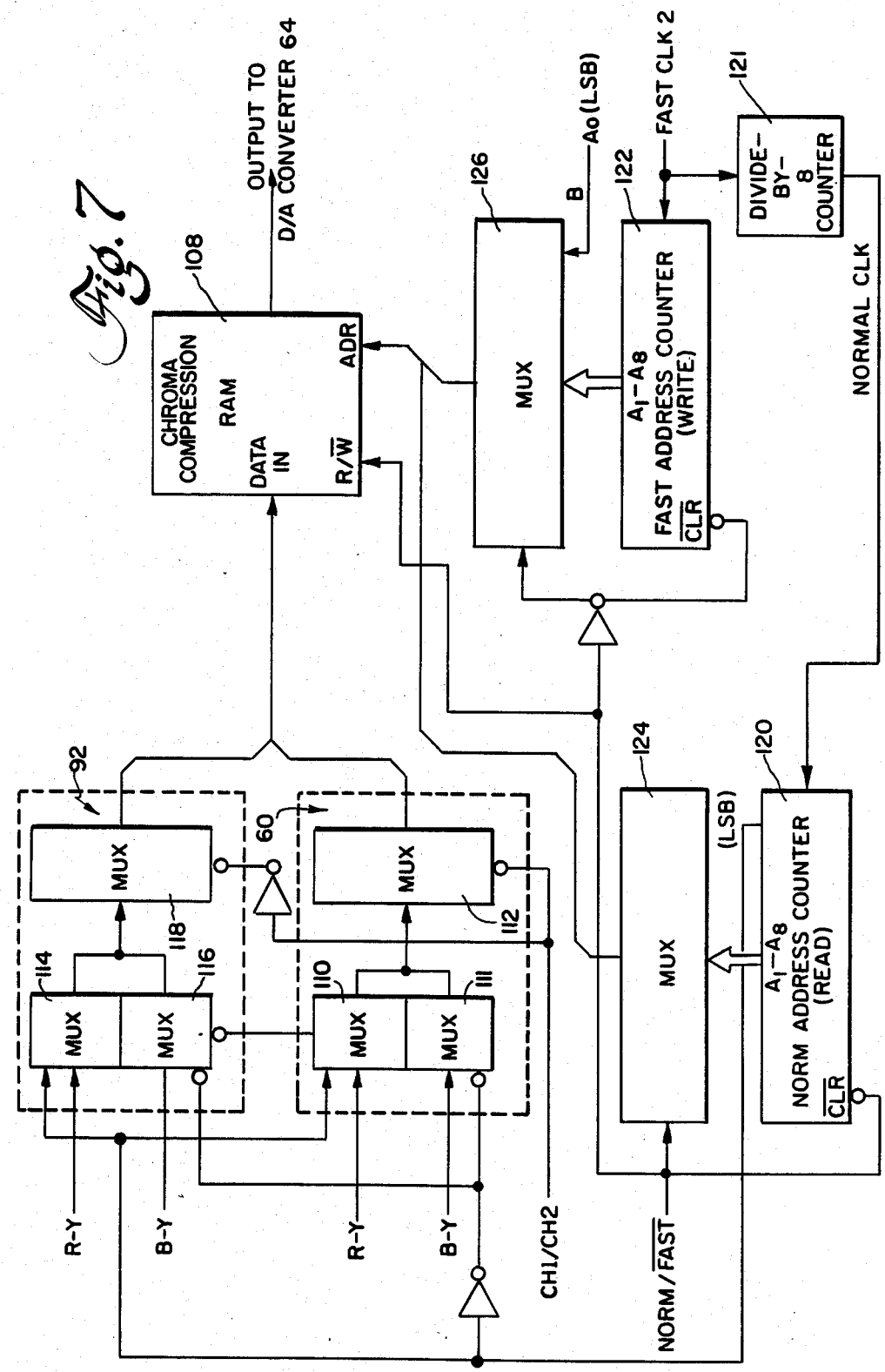
FIG. 7 is a block diagram of the chrominance compression memory used in the transmitter shown in FIG. 4.

The chrominance signals from A/D converters 52 and 54 are multiplexed by multiplexer 60 into a chrominance compression memory 62 which is written during the active video time and read out at a high rate during the horizontal retrace time. The multiplexer 60 may be composed of tristate latches as packaged in 74S374 devices. The chrominance compression memory is shown in FIG. 7 and comprises an IC memory 108 which may be eight Intel 2125H chips. Time compression of the chrominance information is accomplished by means of the chrominance compression memory 62 of FIG. 4. Chrominance information is read into the memory during the active video time at a normal rate, and then during the following inactive video time, the chrominance information is read out of the memory at a fast rate thereby compressing the chrominance information in time.

As shown in FIG. 7, the multiplexer 60 is implemented with three multiplexers 110, 111 and 112. The digitized R-Y and B-Y chrominance information is supplied to the multiplexers 110 and 111, respectively, and these multiplexers have their outputs multiplexed to the data input of memory 108 by the multiplexer 112. A pair of counters 120 and 122 are the address counters for the memory packaged in 74S161 devices. The counter 120 is the write address counter and counts normal clock pulses provided by dividing the fast clock pulses by 8 in a divide-by-8 counter 121. Counter 122 is the read address counter and counts fast clock 2 pulses. These counters are cleared at the beginning of the normal and fast clock pulse intervals, respectively, and the $A_1$–$A_8$ address output signals are supplied to the address input of the memory 108 via multiplexers 124 and 126. These multiplexers may also be implemented with 74S374 devices. The selection of the multiplexers is made by the NORM/$\overline{\text{FAST}}$ gating signal shown in FIG. 5, and this same signal selects the read and write operations of the memory 108. During the fast gate time, stored chrominance data is read out of memory 108 at the fast clock rate, thereby time-compressing the chrominance data. The least significant bit (LSB) $A_0$ of counter 120 is used to select multiplexers 110 and 111 so that R-Y and B-Y chrominance information is written in random access memory 108 every other address. However, when the chrominance information is read out of memory chip 108, the R-Y information is first read out followed by the B-Y information. This is accomplished by supplying the B gating signal shown in FIG. 5 to the multiplexer 126 as the LSB $A_O$ in the read address. Thus, all the R-Y information is read out of the even addresses (LSB=0) and then all the B-Y information is read out of the odd addresses (LSB=1) in this example. Returning for now to FIG. 4, the output signal of the chrominance compression memory 62, in digital form, is fed to a digital-to-analog (D/A) converter 64 and is subsequently combined, in analog form, in summing amplifier 66 with the output signal of a D/A converter 68 driven by the output signal of the memory 58. The narrowed sync pulse generated by the timing circuits 44 is also combined in summing amplifier 66 with the chrominance and luminance signals.

Program one is handled in essentially the same way. The sync pulse of an NTSC standard baseband video signal is stripped in sync stripper 70 of video processor circuitry 73 to identify horizontal and vertical intervals. The chrominance signal information is demodulated in demodulator 72 and converted to digital signals in A/D converters 74 and 76, and the luminance signal is appropriately peaked and filtered in linear phase peaking circuit 78 and low pass filter 80 and then converted to a digital signal in A/D converter 82. At this point, the digital signals are entered into a frame synchronizing memory 84 which is used to exactly match horizontal and vertical intervals between program one and program two. This is necessary in order to insure that the horizontal retrace time, during which time the chrominance for program one or program two is sent, and the active video time, during which time luminance information for both programs is sent, are aligned between the two programs. The timing signals for the frame synchronizer 84 include the H DRV and V DRV signals and the fast clock signals from the timing circuits 44 and 70. Frame synchronizers as well known in the art, and those skilled in the art will be able to provide a suitable frame synchronizer for accomplishing this purpose. However, the preferred embodiment of the present invention incorporates the frame synchronizer disclosed in copending patent application Ser. No. 06/697,601 by Welles, Eichelberger and Wojnarowski to which the reader is referred for further details. The luminance output signal from the frame synchronizer memory 84 is fed to a one horizontal line delay memory 86, the output of which is connected to a D/A converter 88. The memory 86 is identical to memory 58 as shown in FIG. 6.

The luminance from program one is used to amplitude modulate an IF subcarrier whose frequency is 41.25 MHz in IF modulator 90. The subcarrier frequency of 41.25 MHz is 4.5 MHz away from the main IF carrier frequency of 45.75 MHz. The output of the chrominance information from the frame synchronizer memory 84 in the form of R-Y and B-Y color difference signals for program one is multiplexed to the chrominance compression memory 62 via multiplexer 92. During one line, program one chrominance information is written to the memory 62 during the active video portion, and on the next line, chrominance information from program two is written to the memory 62. This is better illustrated in FIG. 7 to which reference is again made. The multiplexer 92, which like multiplexer 60 may be composed of tri-state latches packaged in 74S374 devices, is shown in the Figure as comprising multiplexers 114, 116 and 118. Multiplexer 114 receives the R-Y chrominance information from frame synchronizer 84, while multiplexer 116 receives the B-Y chrominance information. These multiplexers are selected by the least significant bit (LSB), $A_O$, of address counter 120 so that R-Y and B-Y chrominance information are written alternately in the memory 108. However, it will be recalled that chrominance for programs one and two are sent on alternate lines. This is accomplished by the CH1/CH2 program selection signal shown in FIG. 5, which is used to select one of the multiplexers 112 or 118, thereby reading chrominance information for the two programs alternately into memory 108. Always during the horizontal retrace time, as shown in FIG. 4, data written to the chrominance compression memory 62 is read from the memory at high speed, converted to an analog signal through the digital-to-analog converter 64, and combined with the luminance of program two and the narrowed sync pulse in summing amplifier 66. The output signal of summing amplifier 66 is used to modulate the main IF carrier frequency of 45.75 MHz in modulator 94. The output signals of modulators 90 and 94 are combined in a hybrid combiner 96 and supplied to a bandpass filter 99 which filters the combined outputs using a surface acoustic wave (SAW) filter. The hybrid combiner may be implemented with a Mini Circuits MSC2 device, and the SAW filter may be implemented with a Sawtek 8500XX device. The sound carriers from sound circuit 98 for the two programs are supplied to a hybrid combiner 97 which combines the output signal of bandpass filter 99 and the audio. The output signal of hybrid combiner 97 is used to drive an RF up converter 100 which may be implemented with a Jerrold IF/Channel converter ICC-4 device.

Figure 8:
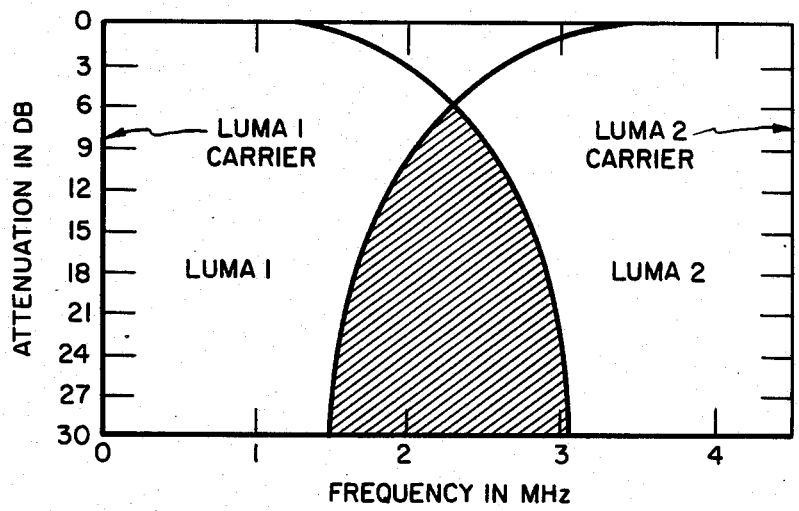
FIG. 8 is a graph of the luminance spectra for the frequency time division bandwidth compression system according to the invention.

One of the stated objects of the invention is to provide a system in which the effects of overlap between the spectra of the two television programs cause minimum observable effect in the selected program. An important distinguishing advantage of the system according to the invention over prior art time division multiplex systems resides in the amount of spectral overlap that can be allowed between two programs. In the present system, the luminance bandwidth of each channel can exceed one half the total bandwidth allowed for luminance by the overlap amount. In the example system, 4.5 MHz of bandwidth has been allowed for luminance. Ordinarily, one half of 4.5 MHz, or 2.25 Mhz, would be allowed for each luminance signal. FIG. 8 shows a preferred spectral embodiment. Note that the spectrum of Luma 1 is limited to $-3$ dB at 2.0 MHz, $-6$ dB at 2.25 MHz, and $-30$ dB at 3.0 MHz. This means that useable luminance response is available at frequencies up to 3.0 MHz. The Luma 2 spectrum is limited in an identical way except that the carrier is located 4.5 MHz removed from the main carrier, with information contained in the lower sideband. The region of overlap is shown cross-hatched in FIG. 8. Ordinarily, overlapping spectra of two different program signals would result in objectionable interference between the signals. The nature of television luminance is such that most information energy occurs in the first 2.0 MHz of the video signal bandwidth with very little energy is above this frequency. this means very little energy is available in the overlap region to interfere with the luminance of the other program signal. In addition, the spectrum of the television luminance is harmonically correlated. Sharp edges in the picture will produce a substantial amplitude low frequency fundamental with reduced amplitude higher frequency harmonics. Because the high frequencies are correlated with the fundamental, they tend to sharpen the edge. When the high frequencies are not correlated with a picture, i.e. when they are from the other luminance signal, they are substantially invisible. This fact allows substantial overlap of the high frequency portion of the luminance spectra of the two program signals. By using the upper sideband of one luminance signal and the lower sideband of the other, any overlap will occur between the high frequencies of the two program signals. If the subcarrier frequency is chosen to be an odd submultiple of the horizontal line rate, then 180° phase reversal will occur between any point on two adjacent lines. This choice results in any objectionable interference from one luminance signal being demodulated by the other luminance demodulator as a more black dot on one line and a more white dot on the next line. The result to the eye at normal viewing distances is to create an average of zero thus further decreasing the effects of overlapping the spectrum.

Another feature of the invention is that it provides a method of system security so as to minimize the display of non-paid for programs or restricted viewing material. This is simply accomplished with the bandwidth compression system according to the present invention by assigning the pay for viewing or restricted viewing material to the channel in which the luminance is transmitted on the subcarrier. An ordinary television receiver tuned to the main carrier would encounter the subcarrier 4.5 MHz removed from the main carrier which is the location where the sound carrier normally resides. For this reason, the subcarrier information would never be displayed on an ordinary televison receiver. It should be noted that the luminance information on the main carrier is not compatible with an ordinary television receiver in that the sync pulse is considerably narrower and modulated in the opposite direction from the NTSC standard.

While the system was described for cable television, it is also useful in other applications such as direct microwave links and direct over-the-air transmissions where bandwidth conservation is desired. The principles of bandwidth conservation according to the invention are not limited to television transmission and may be used to advantage in recording systems. Therefore, it will be understood by those skilled in the art that changes can be made in form and detail without departing from the spirit and scope of the invention.

We claim:

1. A method of compressing two video signals for two television programs, respectively, into the bandwidth normally allowed for one television program, each said video signal including chrominance, luminance and synchronization information, said method comprising the steps of:
   sending, to a receiving site, time-compressed chrominance information for the first and second television programs for alternate lines of each image frame for each program, respectively, during the inactive video time for each of said alternate lines; and sending, to said receiving site, bandwidth-reduced luminance information for both programs during the active video time for each line of each frame for each program, respectively.

2. The method of compressing the video signals of two television programs as recited in claim 1 wherein the step of sending to a receiving site time-compressed chrominance information comprises the steps of:

separating the chrominance, luminance and synchronization information for each said video signal for said first and second programs; and time-compressing the separated chrominance information for each program.

3. The method of compressing the video signals for two television programs as recited in claim 1 further comprising the step of frame synchronizing the separated chrominance information and luminance information of said first program with respect to said second program 4. The method of compressing the video signals for two television programs as recited in claim 3 further comprising the step of generating a sync pulse narrower than a standard NTSC sync pulse from the synchronization information of said second program.

5. The method of compressing the video signals for two television programs as recited in claim 4 further comprising the step of modulating said narrower sync pulse with a depth of modulation which is less than 0%, and wherein said step of sending includes sending said narrower sync pulse during some of the inactive video time.

6. The method of compressing the video signals for two television programs as recited in claim 5 wherein the step of sending said narrower sync pulse is performed before sending the compressed chrominance information.

7. The method of compressing the video signals for two television programs as recited in claim 5 wherein the step of sending said narrower sync pulse is performed after sending the compressed chrominance information.

8. The method of compressing the video signals for two television programs as recited in claim 5 further comprising the steps of:

receiving the time-compressed chrominance information for the first and second programs on alternate lines of each image frame for each program, respectively, together with said narrower sync pulse, during the inactive video time for each of said alternate lines, and the luminance information for both programs during the active video time for each line of each frame for each program, respectively;

detecting the time-compressed chrominance information and the bandwidth-limited luminance information for the first and second programs;

storing the time-compressed chrominance information for one of said lines during the inactive video time for the immediately preceding line and generating said time-compressed chrominance information in a noncompressed form during the active portions of said one of said lines and the line following said one of said lines; and constructing a composite video signal for a selected program by combining the luminance information for said selected program with the generated chrominance information during the active video time for said selected program.

9. The method of compressing the video signals for two television programs as recited in claim 8 further comprising the step of generating a normal sync pulse synchronized with said narrowed sync pulse and wherein the step of constructing the composite video signal includes combining the generated normal sync pulse with the luminance information and generated chrominance information.

10. The method of compressing the video signals for two television programs as recited in claim 8 wherein the step of sending bandwidth-limited luminance information includes the steps of:

generating a carrier signal;

modulating said carrier signal with the separated luminance information from said second program video signal;

generating a subcarrier signal;

modulating said subcarrier signal with the separated luminance information from said first program video signal; and combining the modulated carrier and subcarrier signals;

and wherein the step of receiving includes the steps of:

detecting the modulated carrier signal to recover the luminance information from said seocnd program video signal; and detecting the modulated subcarrier signal to recover the luminance information from said first program video signal.

11. The method of compressing the video signals for two television programs as recited in claim 10 further comprising the step of assigning restricted viewing material to said first program video signal and limiting the selection for viewing to the detected video signal for said second program.

12. A television bandwidth compression system which allows two television programs to simultaneously utilize the bandwidth normally allowed for one television program, said television bandwidth compression system comprising:

separating means for separating chrominance, luminance and synchronization information out of each video signal for the first and second television programs;

time-compression means connected to said separating means for time-compressing the separated chrominance information for each of said first and second television programs;

bandwidth-reducing means connected to said separating means for bandwidth-reducing the separated luminance information for each of said first and second television programs; and transmitting means connected to said time-compression means and said bandwidth-reducing means for transmitting the time-compressed chrominance information for the first and second programs for alternate lines of each image frame for each program, respectively, during the inactive video time for each of said alternate lines, and the bandwidth-reduced luminance information for both programs during the active video time for each line of each frame for each program, respectively.

13. A television bandwidth compression system as recited in claim 12 further comprising frame-synchronizing means connected to said separating means for frame-synchronizing the separated chrominance and luminance information of said first program with respect to the separated chrominance and luminance information of said second program.

14. A television receiver for use in a television bandwidth compression system which allows two television programs to be compressed into the bandwidth normally allowed for one television program wherein time-compressed chrominance signals for the first and second programs are sent for alternate lines of each image frame for each program, respectively, during the inactive video time for each of said alternate lines, and bandwidth-limited luminance signals for both programs are sent during the active video time for each line of each frame for each program, respectively, said receiver comprising:
  detecting means for detecting the time-compressed chrominance signals and the bandwidth-limited luminance signals for said first and second programs;
  storage means, connected to said detecting means, for storing the time-compressed chrominance signal for one of said alternate lines during the horizontal retrace time for the immediately preceding line;
  generating means, connected to said storage means, for generating the noncompressed form of said time-compressed chrominance signal during the active portions of said one of said lines and the next successive line; and
  synthesizing means, connected to said detecting means and said generating means, for constructing a composite of the video signal for a selected program by combining the selected luminance signal with the generated chrominance signal during the active video time for said selected program.

15. A television bandwidth compression system which allows two television programs to simultaneously utilize the bandwidth normally allowed for one television program, said television bandwidth compression system comprising:
  a transmitter, connected to receive a video signal from each of first and second program sources, each said video signal including chrominance, luminance, synchronization and timing signals, providing an output signal wherein chrominance information for said first and second program sources is sent on alternate lines of each image frame for each program, respectively, during the inactive video time and the luminance information for both program sources is sent during the active video time for each line of each image frame for each program, respectively; and
  a receiver, connected to receive the output signal from said transmitter, including selecting means for generating a sync signal and selecting the luminance and chrominance information for either one of said first or second program sources, memory means for storing chrominance information for two horizontal line intervals, said chrominance information being written into said memory means on alternate lines of each image frame for each program, respectively, during the inactive video time and read for two successive lines during the active video time, and means, connected to said selecting means and said memory means, for synthesizing a composite video signal from the output signal from said memory means and the selected luminance information.

16. The bandwidth compression system as recited in claim 15 wherein said transmitter comprises:
  first video processor means, responsive to said first program source, for providing as outputs digital representations of chrominance signals, digital representations of luminance signals, and synchronization signals identifying horizontal and vertical intervals;
  second video processor means, responsive to said second program source, for providing as outputs digital representations of chrominance signals, digital representations of luminance signals, and synchronization signals identifying horizontal and vertical intervals;
  frame synchronization means, connected to receive the digital representations of chrominance signals and the digital representations of luminance signals from said first video processor means and responsive to the synchronization signals from said second video processor means, for aligning the inactive video time, during which time the chrominance information for a program from said first or second program source is sent, and the active video time, during which time luminance information is sent, between the two program sources;
  first delay means, connected to said frame synchronization means, for delaying said digital representations of luminance signals of said first program source for one line period;
  second delay means, connected to said second video processor means, for delaying said digital representations of luminance signals of said second program source for one line period;
  chrominance compression memory means, connected to said frame synchronization means and said second video processor means, for alternately writing digital representations of chrominance signals of said first program source and of said second program source during the active video time and for reading out digital representations of chrominance signals during the horizontal retrace time;
  first, second and third digital-to-analog converter means connected to said first and second delay means and to said chrominance compression memory means, respectively, for converting respective digital output signals therefrom to corresponding analog signals;
  first combining means connected to the outputs of said second and third digital-to-analog converter means and said second video processor means for generating a combined analog video signal;
  first modulator means connected to receive the output of said first digital-to-analog converter means for modulating a subcarrier signal with the delayed luminance signal of said first program source;
  second modulator means connected to receive the output of said first combining means for modulating a main carrier signal with said composite video signal; and
  second combining means connected to said first and second modulator means for combining the outputs thereof to form a bandwidth compressed signal for transmission.

17. The bandwidth compression system as recited in claim 15 wherein said receiver further comprises:

first detector means for providing first luminance signals at baseband and second detector means for providing second luminance signals at baseband;

said selecting means including switching means for selecting the output of said first detector means or the output of said second detector means;

low pass filter means connected to said switching means for passing the luminance signal of a selected program; and additional switching means coupling said low pass filter means to said means for synthesizing a composite video signal.

18. The bandwidth compression system as recited in claim 16 wherein said memory means comprises a switched analog delay means alternately connected to receive as an input the output of said main carrier detector means or the output of said switched analog delay means for alternately storing and recirculating chrominance signals of a selected program.

19. For use in a bandwidth compression system of the type which allows two television programs to simultaneously occupy the bandwidth normally allowed for one television program wherein chrominance information for first and second program sources are sent for alternate lines of each image frame for each program, respectively, during the inactive video time and the luminance information for both program sources is sent during the active video time for each line of each image frame for each program, respectively, a television receiver comprising:

selecting means for selecting the luminance and chrominance information for one of said first and second program sources;

memory means connected to said selecting means for storing chrominance information for two horizontal line intervals, said chrominance information being written into said memory means for alternate lines during the inactive video time and read for two successive lines during the active video time; and means connected to said selecting means and said memory means for synthesizing a composite video signal from the selected luminance information and the output signal of said memory means.

20. The receiver as recited in claim 19 wherein said receiver further comprises:

main carrier detector means for providing a first luminance signal at baseband, and subcarrier detector means for providing a second luminance signal at baseband;

said means for selecting comprising switching means for selecting the output of said main carrier detector means or the output of said subcarrier detector means;

low pass filter means connected to said switching means for passing the luminance signal of a selected program; and additional switching means coupling said low pass filter means to said means for synthesizing a composite video signal.

21. The receiver as recited in claim 20 wherein said memory means comprises switched analog delay means alternately connected to receive as its input the output of said main carrier detector means or the output of said switched analog delay means for alternately storing and recirculating chrominance signals of a selected program.

22. A method of transmitting two video luminance signals having different carrier frequencies with overlapping spectra such that the overlap causes only minimum observable effect in the video image produced by either of said signals, comprising the steps of:

transmitting on a communications medium one of said signals with an upper sideband bandwidth of a first fixed frequency; and transmitting on said communications medium the second of said signals with a lower sideband bandwidth of a second fixed frequency, the sum of said first and second fixed frequencies being greater than the separation between said different carrier frequencies.

23. The method of claim 22 wherein the sum of said first and second fixed frequencies is 6 MHz.

24. The method of claim 23 wherein the separation between said different carrier frequencies is 4.5 MHz.

* * * * *